United States Patent
Orekondy et al.

(10) Patent No.: US 12,316,396 B2
(45) Date of Patent: May 27, 2025

(54) WIRELESS CHANNEL RENDERING USING NEURAL NETWORKS

(71) Applicant: QUALCOMM Incorporated, San Diego, CA (US)

(72) Inventors: Tribhuvanesh Orekondy, Biel (CH); Arash Behboodi, Amsterdam (NL); Hao Ye, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 17/935,006

(22) Filed: Sep. 23, 2022

(65) Prior Publication Data

US 2024/0113795 A1   Apr. 4, 2024

(51) Int. Cl.
*H04B 17/391* (2015.01)

(52) U.S. Cl.
CPC ................... *H04B 17/391* (2015.01)

(58) Field of Classification Search
CPC .................................... H04B 17/91
See application file for complete search history.

(56) References Cited

U.S. PATENT DOCUMENTS

| | | | | |
|---|---|---|---|---|
| 2009/0041150 A1* | 2/2009 | Tsai | ...... | H04B 7/0632 343/893 |
| 2015/0373736 A1* | 12/2015 | Ji | ...... | H04L 5/0048 370/330 |
| 2021/0143879 A1* | 5/2021 | Ji | ...... | H04B 7/0691 |
| 2023/0131694 A1* | 4/2023 | Saber | ...... | G06N 3/0455 370/252 |
| 2023/0289999 A1* | 9/2023 | Goforth | ...... | G06N 3/045 |

OTHER PUBLICATIONS

Bae J., et al., "Neural Marionette: Unsupervised Learning of Motion Skeleton and Latent Dynamics from Volumetric Video", arXiv:2022. 08418v1 [cs. CV], Cornell University Library, 201 Olin Library Cornell University Ithaca, NY 14853, Feb. 17, 2022, 24 Pages, XP091161056, Section 4, A.2.
Dreifuerst R.M., et al., "SignalNet: A Low Resolution Sinusoid Decomposition and Estimation Network", arxiv.org, Cornell University Library, 201 Olin Library Cornell University Ithaca, NY 14853, Jun. 10, 2021, pp. 1-16, XP091125210, Section II.
International Search Report and Written Opinion—PCT/US2023/070762—ISA/EPO—Jan. 18, 2024.

(Continued)

*Primary Examiner* — Natasha W Cosme
(74) *Attorney, Agent, or Firm* — Patterson & Sheridan LLP

(57) ABSTRACT

Certain aspects of the present disclosure provide techniques and apparatuses for training and using machine learning models to estimate a representation of a channel between a transmitter and a receiver in a spatial environment. An example method generally includes estimating a representation of a channel using a machine learning model trained to generate the estimated representation of the channel based on a location of a transmitter in a spatial environment, a location of a receiver in the spatial environment, and information about the spatial environment. One or more actions are taken based on the estimated representation of the channel.

26 Claims, 8 Drawing Sheets

(56) References Cited

OTHER PUBLICATIONS

Bakirtzis S., et al., "EM DeepRay: An Expedient, Generalizable, and Realistic Data-Driven Indoor Propagation Model", IEEE Transactions on Antennas and Propagation, IEEE, USA, vol. 70, No. 6, May 6, 2022, pp. 1-15, XP011911234, DOI: 10.1109/TAP.2022.3172221, sections III-IV, figure 4, section IV.
Ebrahiem K.M., et al., "A Deep Learning Approach for Channel Estimation in SG Wireless Communications", 2021 38th National Radio Science Conference (NRSC), IEEE, vol. 1, Jul. 27, 2021, pp. 117-125, XP033960125, DOI: 10.1109/NRSC52299.2021.9509813, section IV.
Lin X., et al., "Location Aided Intelligent Deep Learning Channel Estimation for Millimeter Wave Communications", 2020 IEEE/CIC International Conference on Communications in China (ICCC), IEEE, Aug. 9, 2020, pp. 489-494, XP033853245, DOI: 10.1109/ICCC49849.2020.9238853, sections II-III, figures 1-2.
Partial International Search Report—PCT/US2023/070762—ISA/EPO—Oct. 31, 2023.

\* cited by examiner

WIRELESS CHANNEL RENDERING USING NEURAL NETWORKS

INTRODUCTION

Aspects of the present disclosure relate to using machine learning to estimate a wireless channel using a neural network.

In a wireless communications system, information about a wireless channel can be used for various purposes. For example, information about the wireless channel can be used to identify various parameters for communications between a transmitter and a receiver, such as beamforming parameters, directional beam selection, and the like. Information about a wireless channel can also be used to determine the layout of a spatial environment in which the transmitter and receiver are located, which in turn may be used for various purposes such as detecting entry and exit of devices into different areas (e.g., defined based on a radius from a given device). Layout information and location estimation can be used for many other purposes as well, such as emergency management within the spatial area, spatial optimization, and the like.

The state of a wireless channel generally depends on various factors in the spatial environment. For example, a wireless channel may be affected by sources of radio frequency interference, such as interfering network entities. In another example, hard surfaces, such as walls, support columns, or the like, and the materials in these environments, may introduce attenuation and reflections of radio waves in radio frequency measurements obtained within the spatial area. Because the state of a wireless channel may depend on many factors that are different across different environments, it may be difficult to estimate the state of a wireless channel.

Accordingly, what is needed are improved techniques for estimating a wireless channel in a spatial environment.

BRIEF SUMMARY

One aspect provides a method for estimating a wireless channel using a machine learning model. An example method generally includes estimating a representation of a channel using a machine learning model trained to generate the estimated representation of the channel based on a location of a transmitter in a spatial environment, a location of a receiver in the spatial environment, and information about the spatial environment. One or more actions are taken based on the estimated representation of the channel.

Another aspect provides a method for training a machine learning model to estimate a wireless channel. An example method generally includes generating a training data set including a plurality of samples. Generally, each sample corresponds to a location of a receiver in a spatial environment and a location of a transmitter in the spatial environment and includes a plurality of vectors, each respective vector representing a respective signal component received at the receiver while traversing the spatial environment. A machine learning model is trained to generate an estimated representation of a channel based on information about the spatial environment and the training data set.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
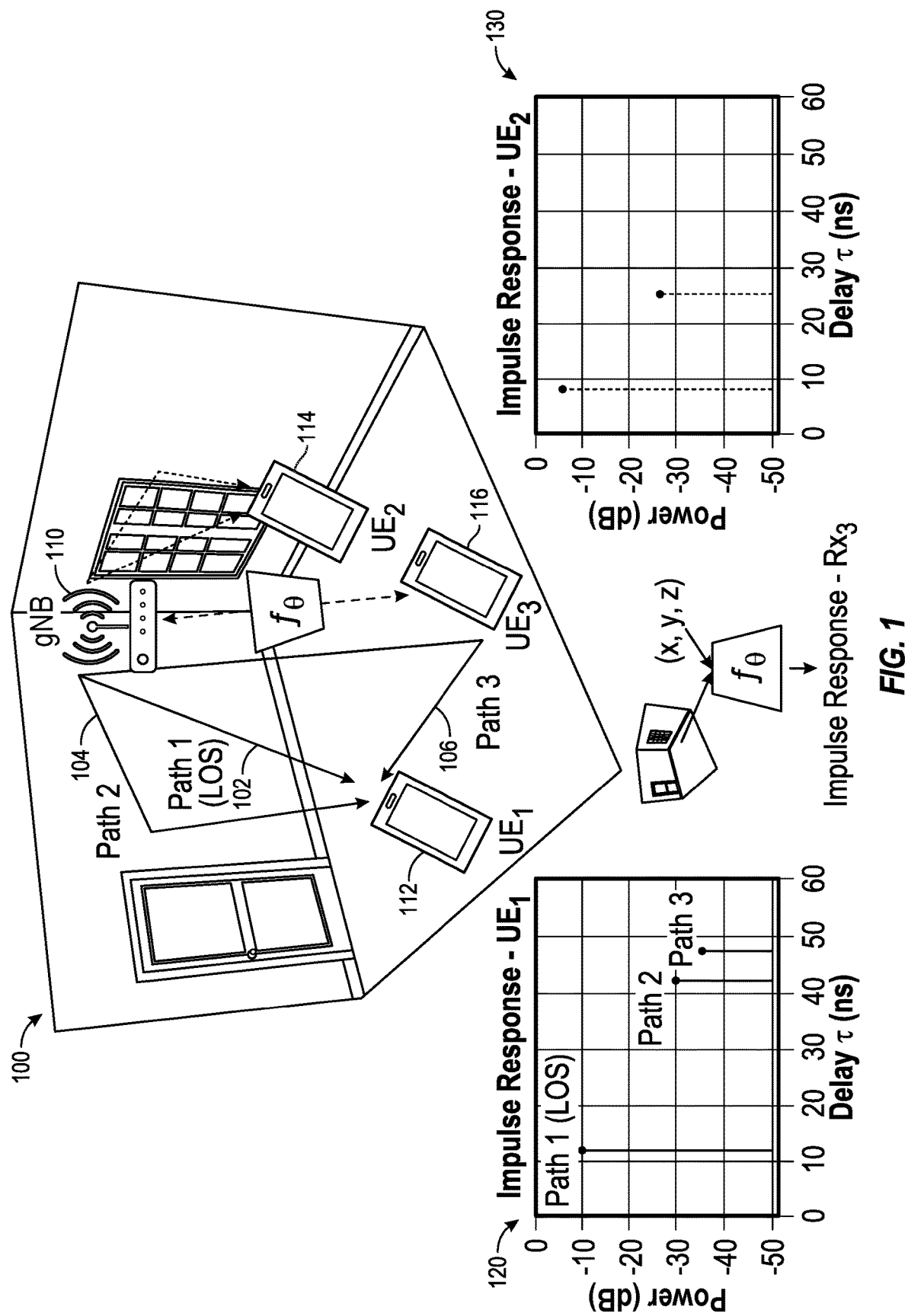
FIG. 1 depicts signals transmitted between a transmitter and receivers in a spatial environment.

Aspects of the present disclosure provide techniques and apparatuses for estimating a channel between a transmitter and a receiver based on positional information for the transmitter and the receiver and the layout of the spatial area in which the transmitter and receiver are operating.

Information about a channel, such as an estimate of the channel at a receiver, can be used for various tasks within a wireless communications system and/or within systems that use devices that communicate within a wireless communications system. For example, the information about a channel can be used for signal management, such as beamforming or beam selection, for communications between the transmitter and the receiver. In another example, information about a channel can be used for various sensing tasks, such as location estimation, floor map estimation, or the like. This information may, in turn, be used to determine how a spatial area is to be used, to generate a virtual reality or extended reality scene in the spatial area, for traffic management within the spatial area, for location estimation, and the like. In still further examples, learnt positions of signal reflectors in a spatial environment and the signal reflection properties of these reflectors, can be used to perform various tasks in dynamic environments, such as autonomous driving or other autonomous operations in which the state of the environment continually changes.

Various techniques can be used to estimate information about a channel, given information about the location of a transmitter and the location of a receiver in a spatial environment. For example, neural statistical models, implemented as deep neural networks, can be used to generate an estimate, or estimation, of a channel based on various field measurements for the transmitter and receiver. These models may allow for the estimation of a channel in various generic scenarios with minimal computational expense. However, the channel estimates generated by these models may reflect channel estimates in a generic environment and may not take into account environment-specific properties that affect the state of the channel at the receiver. For example, these generic models may not take into account reflections of signals off of surfaces within a spatial environment, signal attenuation due to these reflections, signal attenuation and reflectivity properties of different materials used within a spatial environment, and the like.

Aspects of the present disclosure provide techniques that allow for a channel to be estimated based on a spatially consistent machine learning model that takes into account information about the environment in which a transmitter and receiver operates in estimating information about the channel. By doing so, aspects of the present disclosure can generate accurate estimations of a channel between a transmitter and a receiver in any given environment. These estimations of a channel may take into account different components of a wireless signal that are received at the receiver at different times due to different propagation paths within the spatial environment and can disregard signal components that have minimal impact on the overall received channel at the receiver. By accurately estimating a channel in a spatial environment, aspects of the present disclosure may allow for improved accuracy in applications that use estimates of a channel to perform various tasks. For example, the accurate channel estimations generated by the machine learning models discussed herein may allow for improved communications in various spatial environments and at various frequencies at which transmitters and receivers communicate, as these accurate channel estimations may be used to identify blockages within the spatial environment that degrade a wireless signal, to estimate optimal beams to use in high-frequency (e.g., millimeter wave (mmWave)) communications between a transmitter and a receiver, and the like. Further the machine learning models discussed herein may allow for propagation of a signal between a transmitter and a receiver to be modeled, which may allow for information about the spatial environment, such as the presence of reflective or refractive surfaces in the spatial environment and the radio frequency reflectivity and attenuation properties of these surfaces, to be obtained from the estimation of the channel generated by these machine learning models.

Example Radio Frequency Signals in a Spatial Area

FIG. 1 illustrates example signals transmitted between a transmitter and various receivers within a spatial environment.

As illustrated, within spatial environment 100, a transmitter 110 transmits signals to receivers 112, 114, and 116. Transmitter 110 may be, for example, a gNodeB in a cellular telecommunications system, and receivers 112, 114, and 116 may be user equipments (UEs) serviced by the gNodeB.

Because spatial environment 100 includes various surfaces from which signals can be reflected, such as walls, floors, ceilings, or other surfaces, signaling transmitted between a transmitter 110 and receivers 112, 114, and 116 may include a line-of-sight (LOS) component and, in some cases, one or more non-LOS components. For example, as illustrated, a signal received at receiver 112 includes an LOS component corresponding to Path 1 102, a first non-LOS component corresponding to Path 2 104 in which receiver 112 receives the reflection of the signal off of a wall in spatial environment 100, and a second non-LOS component corresponding to Path 3 106 in which receiver 112 receives the reflection of the signal off of a floor in spatial environment 100. Similarly, a signal received at receiver 114 includes an LOS component and a non-LOS component in which receiver 114 receives the reflection of the signal off of a wall in spatial environment 100.

Because a receiver can receive a signal including an LOS component and non-LOS components, a total impulse response (or signal strength) f a for any signal transmitted by transmitter 110 may thus include the impulse response for the LOS component and the impulse responses for the non-LOS components. As illustrated in impulse response plot 120 for receiver 112 and impulse response plot 130 for receiver 114, the LOS component may have the highest impulse response and shortest delay between transmission by transmitter 110 and reception by the appropriate receiver, and the non-LOS components may have lower impulse responses and longer delays between transmission and reception relative to the LOS components. These non-LOS components may have lower impulse responses due to various factors, including signal attenuation from the surfaces from which these signals reflect, as different surfaces may introduce different amounts of signal attenuation into a non-LOS component, and the total distance traversed between a transmitter and a receiver, as signal strength generally decreases as a function of distance.

Generally, a global representation of a wireless channel can be modeled by the equation:

$$y(t) = \sum_i a_i(t) x(t - \tau_i(t))$$

where y(t) is the global representation of the channel at time t, $a_i$ represents the gain for the $i^{th}$ path and $\tau_i$ represents the delay for the $i^{th}$ path. This global representation illustrates that the wireless channel is the aggregate of signals received at the receiver for each path from the transmitter to the receiver (e.g., for both the LOS and non-LOS components). However, this global representation may not allow for the propagation properties of a signal on any given path to be modeled. More specifically, for a given path, the global representation may not allow for reflection and signal attenuation to be modeled for any non-LOS component of the signal.

To account for various properties of three-dimensional spatial environments that influence signal reflection and signal attenuation, and to allow for channel estimation within various spatial environments based on signal measurements obtained for a received signal within a spatial environment, aspects of the present disclosure provide techniques for estimating a representation of a channel using a neural network based on the locations of transmitters and receivers within a spatial environment and three-dimensional representations of the spatial environment. As discussed in further detail herein, a neural network may estimate a channel based on estimations of signal attenuation due to propagation distance and of signal attenuation due to ray-surface interactions (e.g., signal absorption, reflection angle, etc.). The overall channel may be rendered based on these estimations such that the channel includes signal components that are deemed to have been received by the receiver (e.g., propagate to points within a defined reception ellipsoid for the receiver) and excludes signal components that have an insignificant impact on the overall channel due to attenuation below a threshold signal strength.

Example Estimation of a Wireless Channel Using Machine Learning Models

As discussed, within a wireless communication system, a signal may be represented as a series of components received at a receiver. Each component may, for example, correspond to a ray emitted from a location within a spatial environment of a transmitter that reaches a reception sphere defined as a location of a receiver within the spatial environment and a radius from this location. Properties of each signal component, such as a received power, time of flight, angles of departure and arrival, and the like may be influenced by various factors, such as the two-dimensional layout of the spatial environment (e.g., the locations of walls or other reflecting surfaces, etc.), the location of the transmitter in the spatial environment, and the location of the receiver in the spatial environment.

Generally, statistical channel models and generative channel models can estimate a representation of a channel with low computational expense. However, these statistical channel models and generative channel models may not be portable. That is, statistical channel models and generative channel models may be trained or otherwise configured to estimate a representation of a channel within a specific spatial environment (e.g., a specific room or set of rooms in a building). Because these statistical channel models and generative channel models are tightly bound to a specific spatial environment, significant computational expense may be incurred in building models that estimate a channel in a variety of spatial environments.

Aspects of the present disclosure provide techniques and apparatuses that allow for the estimation of a channel in a variety of spatial environments using machine learning models. These machine learning models generally use information about the spatial environment in which a transmitter and a receiver are located, as well as the locations of the transmitter and the receiver in the spatial environment, to render an estimation of a channel between the transmitter and the receiver. These machine learning models may do so without incurring the computational expense of computationally complex operations that model the propagation of large numbers of signal components within a spatial environment. Thus, aspects of the present disclosure provide efficient and portable techniques for estimating wireless channels across a variety of spatial environments.

Figure 2:
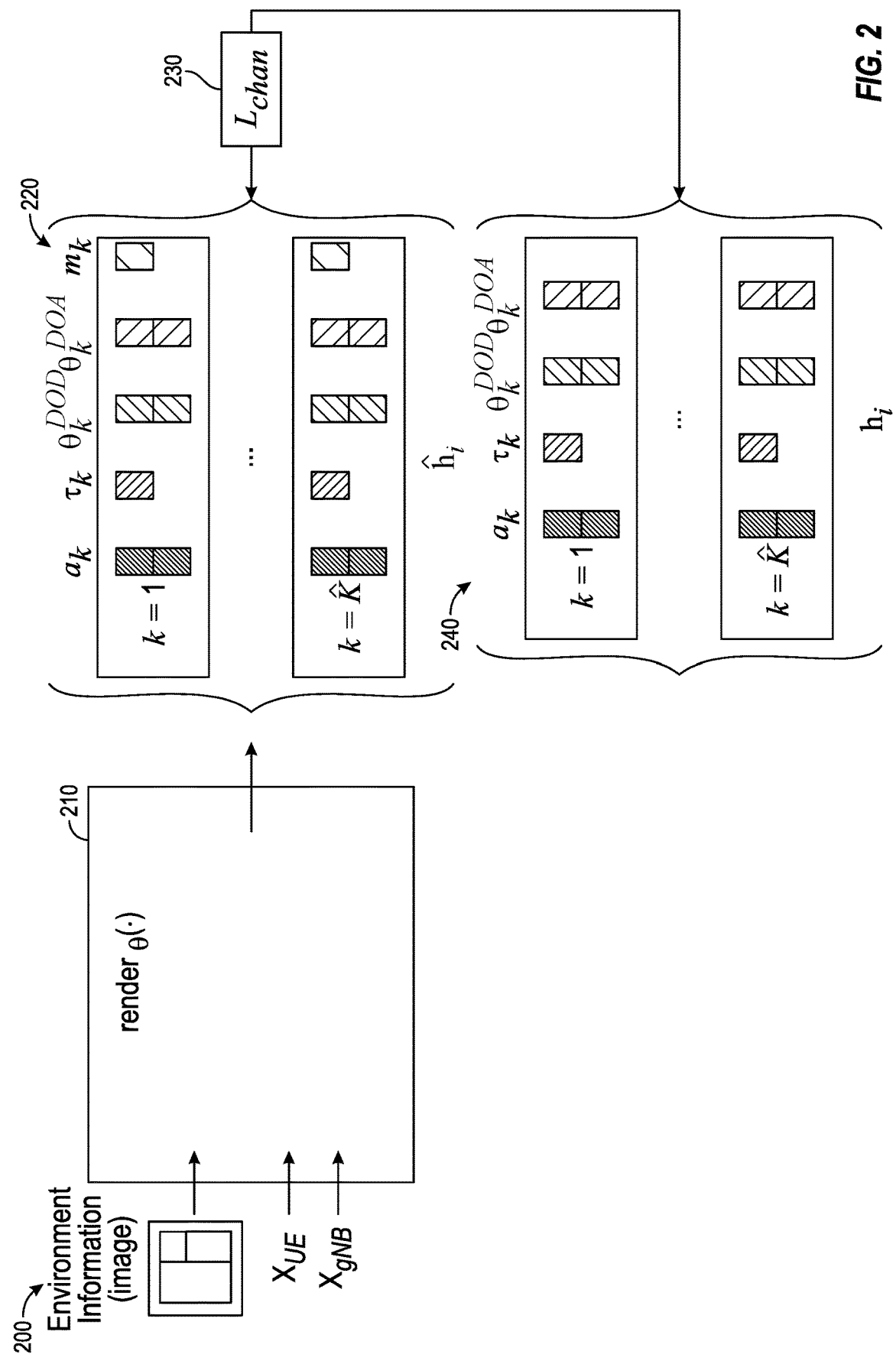
FIG. 2 depicts an example pipeline for estimating a wireless channel using a machine learning model, according to aspects of the present disclosure.

FIG. 2 illustrates a pipeline 200 for estimating a wireless channel in a spatial environment using a machine learning model, according to aspects of the present disclosure. As illustrated, pipeline 200 includes a renderer 210 and a loss minimization function 230. Renderer 210 generally represents a machine learning model that is trained to use information about a spatial environment (e.g., an image depicting a two-dimensional layout of the spatial environment), the location $x_{UE}$ of a receiver (e.g., a user equipment (UE) in a wireless communications system), and the location $x_{gNB}$ of a transmitter (e.g., a base station, such as a gNodeB (gNB) in the wireless communications system) to generate an estimation 220 of the channel. The locations $x_{UE}$ and $x_{gNB}$ may be represented as vectors and may be different from the scalar value of x included in a position vector discussed below with respect to FIG. 3.

Estimation 220 of the channel between the transmitter and the receiver may include a plurality of vectors, each corresponding to a signal component received at the receiver (e.g., one of a plurality of multipath components which, when combined, represents the received signal at the receiver). Each signal component in estimation 220 may be represented as a collection of scalar and vector data. For example, as illustrated, each signal component k may be represented as a power data vector $a_k$ (which may include a power at which the signal component was transmitted from the transmitter to the receiver and a power at which the transmitted signal component was received at the receiver), a scalar time-of-flight component $\tau_k$ representing the elapsed time between transmission and reception of the signal component, a vector representing the angle of departure component $\theta_k^{DOD}$ corresponding to the direction of departure (DOD) of a signal component from a transmitter, and a vector representing the angle of arrival component $\theta_k^{DOA}$ corresponding to the direction of arrival (DOA) of a signal component at the receiver. In some aspects, a signal component in estimation 220 may further include information $m_k$ indicating a confidence level associated with the signal component. This signal component may be used, for example, to indicate a likelihood that a signal component is valid or otherwise has a meaningful impact on the rendered channel at the receiver.

Renderer 210 may be trained based on ground-truth data 240 for a variety of scenarios in a variety of spatial environments. Ground-truth data 240 generally corresponds to the actual representation of the channel between the transmitter (e.g., gNB) and receiver (UE) in a specific spatial environment and also includes a plurality of signal components. Generally ground-truth data 240 is used to train a machine learning model so that, during the training process, estimations generated by the machine learning model can be compared to the ground-truth data 240. The difference between an estimation generated by the machine learning model and the ground-truth data 240 can be used to further train the machine learning model so that the machine learning model can learn to generate estimations that are closer to the ground-truth data 240, and thus result in a machine learning model that can be assumed to generate accurate estimations for a variety of scenarios. Each signal component k, as with the estimation $\hat{h}$ 220, includes a power data vector $a_k$, a scalar time-of-flight component $\tau_k$, a vector representing the angle of departure component $\theta_k^{DOD}$, and a vector representing the angle of arrival component $\theta_k^{DOA}$. That is, estimation $\hat{h}$ 220 may be represented by the equation: $\hat{h}_t = \text{render}_\theta(x_t^{UE}, x_t^{gNB}; F_t)$. To train the renderer 210, loss minimization function 230 may be configured to calculate a loss, $\mathcal{L}_{chan}$, between the estimation 220 of the channel in the spatial environment and the actual representation of the channel defined in ground-truth data 240 and use this loss in executing subsequent training rounds for the machine learning models used by renderer 210, as discussed in further detail below. Loss minimization function 230 may minimize, or at least reduce, a loss between an estimation 220 and ground-truth data h 240. In minimizing, or at least reducing, a loss, loss minimization function 230 can identify a global minimum, a local minimum, or at least a reduction in a loss relative to a loss calculated for estimations generated by a machine learning model in a previous round of training. For example, a loss function may be represented as $\mathcal{L}_{chan}(\hat{h}, h)$, loss minimization function 230 may be represented by the equation: $\min \Sigma_i \mathcal{L}_{chan}(\hat{h}_i, h_i)$.

In some aspects, the information about the spatial environment input into renderer 210 may be an image depicting a layout of the spatial environment. The image may be, for example, a two-dimensional image showing the layout of rooms or other discrete spaces in the spatial environment, openings between rooms or other discrete spaces in the spatial environment, and the boundaries of the spatial environment. To use this information as an input into a machine learning model, the image depicting the layout of the spatial environment may be converted into a representation usable in a machine learning model, such as an embedding of the image generated by a model (or sub-model) trained to embed image data into a different data space.

Figure 3:
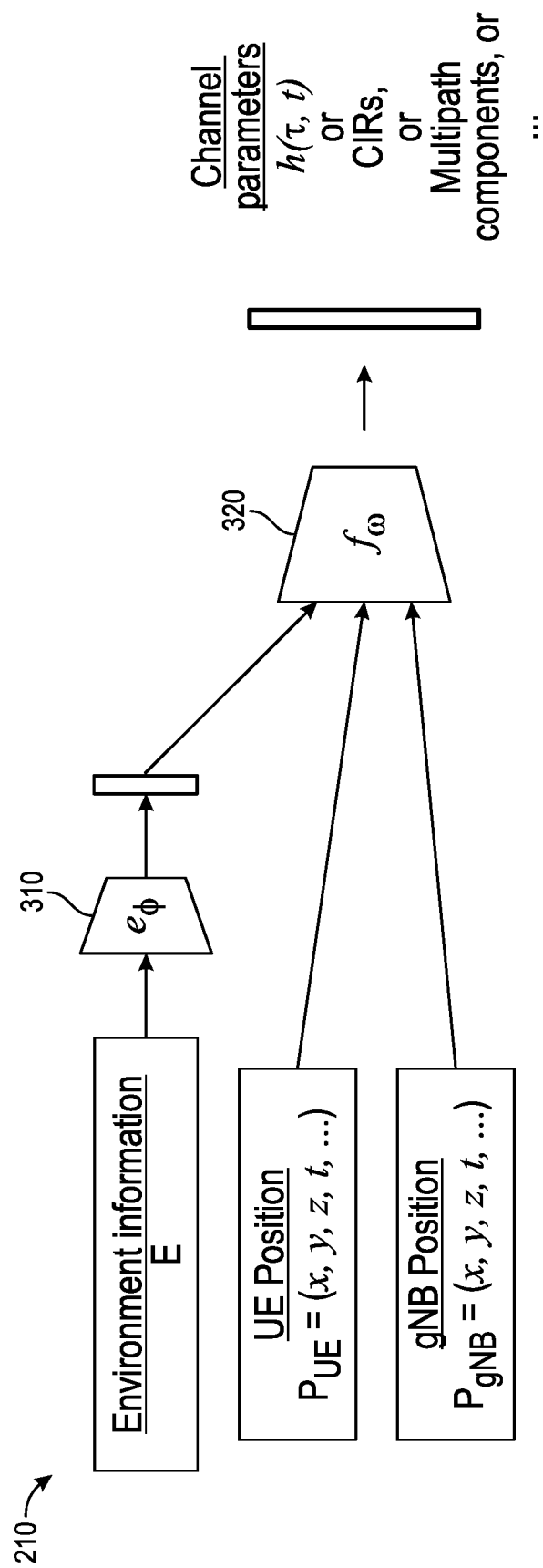
FIG. 3 depicts an example machine learning model that generates an estimated representation of a channel based on a location of a transmitter in a spatial environment, a location of a receiver in the spatial environment, and information about the spatial environment, according to aspects of the present disclosure.

FIG. 3 illustrates an example renderer 210 in which machine learning models are used to generate an estimated representation of a channel based on a location of a transmitter in a spatial environment, a location of a receiver in the spatial environment, and information about the spatial environment, according to aspects of the present disclosure.

As illustrated, renderer 210 includes a first machine learning model 310 and a second machine learning model 320. First machine learning model 310, designated as $e_\phi$, is generally a machine learning model that is trained to generate an embedding representation of the information about the environment in which a transmitter and receiver are communicating and for which a channel is to be estimated. This machine learning model may, in some aspects, be the encoder portion of a variational autoencoder (VAE) that is trained to generate a vector representing the spatial environment in which signal components propagate from a transmitter to a receiver. This vector may be input into second machine learning model 320 to condition rendering of the channel based on the layout of the environment in which the transmitter and receiver operate.

In some aspects, the first machine learning model 310 may be trained on a training data set of a plurality of two-dimensional floor map images representing a layout of different spatial environments. In aspects where the first machine learning model 310 is a variational autoencoder, the first machine learning model 310 may be trained as an encoder $e_\phi$ and a decoder $d_\phi$. The encoder $e_\phi$ and a decoder $d_\phi$ may be, for example, multilayer perceptrons (MLPs) implemented as two-layer rectified linear units. Generally, the encoder $e_\phi$ may be trained to encode an input $x_i$ (e.g., a two-dimensional representation of a spatial environment) into an embedding representation $z_i \in \mathbb{R}^D$, where D represents the number of dimensions in the space in which the embedding representation $z_i$ lies. Embedding representation $z_i$ may be a vector different from the scalar z (e.g., position on the z axis) in the position vectors described below. Generally, D may be set so that the embedding representation $z_i$ is located in a highly dimensional space to improve the accuracy of the rendered channel and allow for the rendered channel to be rendered along a larger number of dimensions than the number of dimensions in a physical space. The decoder $d_\phi$ generally is trained to generate a reconstruction $\hat{x}_i$ of an input $x_i$ from the embedding representation $z_i$ into which encoder $e_\phi$ encodes the input $x_i$. The variational autoencoder may be trained to minimize, or at least reduce, a loss between $x_i$ and $\hat{x}_i$.

The second machine learning model 320 generally uses the embedding representation $z_i$, along with receiver position information (designated as $P_{UE}=(x, y, z, t, \ldots)$) and transmitter position information (designated as $P_{gNB}=(x, y, z, t, \ldots)$) to render a continuous representation of a channel between the transmitter and the receiver or otherwise generate an estimation of a channel (e.g., including channel impulse responses (CIRs), an identification of multipath components in the channel, etc.). The second machine learning model 320 may, in some aspects, be a coordinate MLP configured to generate a signal output from a set of spatial coordinates. This MLP may include multiple layers and use rectifier linear unit activation.

In some aspects, coordinate information associated with the position of the receiver and the position of the transmitter may be converted to a higher-dimensionality representation through a transformation $\gamma$. This transformation may be, in some aspects, a Fourier transform which allows for the generation of higher-dimensionality data from a data set of lower-dimensional data. In some aspects, the Fourier transform may be an identity mapping such that $\gamma(x)=x$. In another example, the Fourier transform may be represented by the equation:

$$\gamma(x) = \begin{bmatrix} \cos(2\pi Bx) \\ \sin(2\pi Bx) \end{bmatrix}$$

where $B \in \mathbb{R}^{m \times d} \sim \mathcal{N}(0, I\sigma^2)$ and represents a random Gaussian matrix that maps low-dimensional coordinates x to a high-dimensional vector $\gamma(x)$.

In some aspects, the output of renderer 210 may include a variety of components, such as a channel h defined in terms of a time $\tau$ at which the signal is rendered and all times t, a channel impulse response, multipath components, and/or other data which can provide information about a channel between a transmitter and a receiver.

In some aspects, the second machine learning model 320 may be trained using supervised learning techniques. A data set used to train the machine learning model may include data generated via a ray tracing software package or real-life data obtained along a path traversed through a spatial environment. For example, a data set used to train the machine learning model may include data obtained for a plurality of discrete spots within the spatial environment corresponding to grid locations in the spatial environment. Assume, for example, a spatial environment that is 60 meters wide by 30 meters deep. The data set used to train the machine learning model may include data obtained for each square meter-sized block in this spatial environment, resulting in a data set of 1,800 samples for the spatial environment and a fixed transmitter location in the spatial environment. This process may be repeated for a plurality of different transmitter locations in the spatial environment to allow for the second machine learning model 320 to be trained using a richer, more detailed data set.

Figure 4:
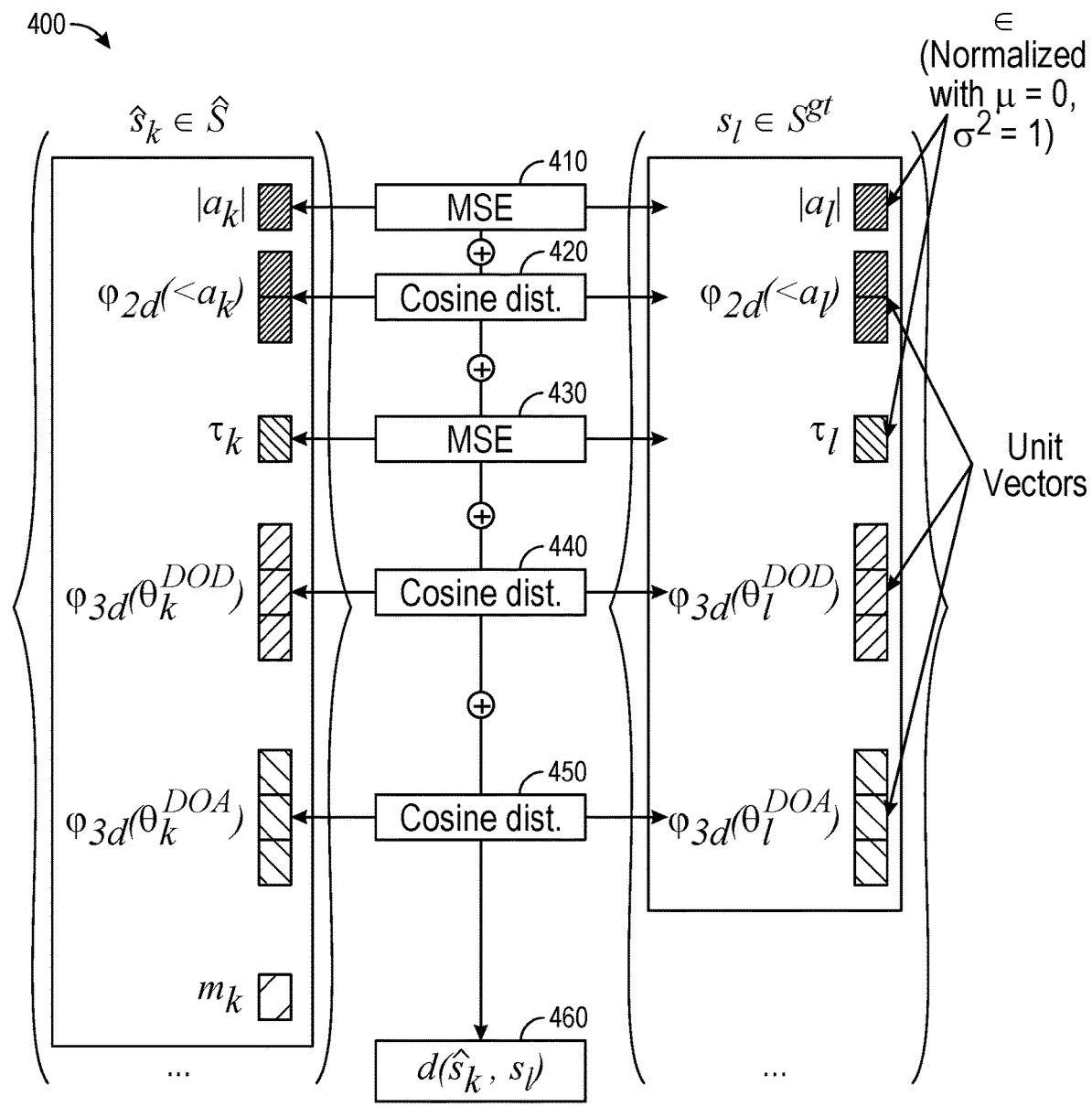
FIG. 4 depicts an example of minimizing, or at least reducing, a loss between an estimated representation of a channel and a ground-truth representation of the channel, according to aspects of the present disclosure.

FIG. 4 illustrates an example 400 of minimizing, or at least reducing, a loss between an estimated representation of a channel and a ground-truth representation of the channel, according to aspects of the present disclosure.

As discussed, an estimated representation of a channel component, designated $\hat{s}_k$, and a ground-truth representation of the channel component, designated $s_l$, may include a plurality of data components, with some of these data components being scalar components and some of these data components being vector components. $\mathcal{S}^{gt}$ corresponds to a ground-truth channel represented as a set including multiple paths $s_l \in \mathcal{S}^{gt}$. Each path $s_l$ includes various pieces of information defining or otherwise providing information about a signal received at a receiver, including received power, time of flight, angle of departure, and angle of arrival information for the signal corresponding to $s_l$. $\hat{\mathcal{S}}$, meanwhile, corresponds to an estimated channel, also represented as a set including multiple paths $\hat{s}_k \in \hat{\mathcal{S}}$.

Generally, a difference between scalar components may be calculated as a mean squared error (MSE) between a scalar component in the estimated representation of the channel $\hat{s}_k$ and the corresponding scalar component in the estimated representation of the channel $s_l$. Meanwhile, a difference between vector components may be calculated as a cosine distance between a vector component in the estimated representation of the channel $\hat{s}_k$ and the corresponding vector component in the ground-truth representation of the channel $s_l$. The total distance d 460 between the estimated representation of the channel $\hat{s}_k$ and the ground-truth representation of the channel $s_l$ may be the sum of each distance calculated between corresponding components in the estimated representation of the channel $\hat{s}_k$ and the ground-truth representation of the channel $s_l$.

For example, as illustrated, an estimated representation of a channel includes received power scalar value $a_k$ (which may be a power at which the signal component was received at the receiver), a scalar time-of-flight component $\tau_k$ representing the elapsed time between transmission and reception of the signal component, a vector representing the angle of departure component $\theta_k^{DOD}$, and a vector representing the angle of arrival component $\theta_k^{DOA}$. In some aspects, the estimated representation of the channel may also include two-dimensional Cartesian coordinates associated with phase angle for the received signal component, which may be defined as $\varphi_{2d}(\angle a_k)$. $\varphi_{2d}$ may be defined according to the expression:

$$\varphi_{2d}(\theta) = \begin{bmatrix} \sin\theta \\ \cos\theta \end{bmatrix}$$

In some aspects, three-dimensional Cartesian coordinates may be obtained for the angle of departure component $\theta_k^{DOD}$ and the angle of arrival component $\theta_k^{DOA}$. For a given angle $\theta$ of departure or arrival and phase shift $\phi$, the three-dimensional Cartesian coordinates $\varphi_{3d}([\theta, \phi])$ may be defined according to the expression:

$$\varphi_{3d}([\theta, \phi]) = \begin{bmatrix} \sin\theta\cos\phi \\ \sin\theta\sin\phi \\ \cos\theta \end{bmatrix}$$

As illustrated, thus, distance between the estimated representation of a channel component $\hat{s}_k$ and a ground-truth representation of the channel component $s_l$ may be the summation of the received power difference 410, angular power difference 420, time of flight difference 430, angle of departure difference 440, and angle of arrival difference 450. The received power difference 410 and the time of flight difference 430 may be calculated as a mean squared error value, as these components may be represented in the estimated representation of a channel component $\hat{s}_k$ and a ground-truth representation of the channel component $s_l$ as scalar values. Meanwhile, the angular power difference 420, angle of departure difference 440, and angle of arrival difference 450 may be calculated as a cosine difference value, as these components may be represented in the estimated representation of a channel component $\hat{s}_k$ and a ground-truth representation of the channel component $s_l$ as vector components.

A loss function between the estimated representation of a channel $\hat{\mathcal{S}}$ and a ground-truth representation of the channel $\mathcal{S}^{gt}$ may, in some aspects, be calculated based on a Chamfer distance between the estimated representation of a channel and a ground-truth representation of the channel and a binary cross-entropy (BCE) calculated between the confidence score m for a channel component in the estimated representation of a channel and a ground-truth representation of the channel. The Chamfer distance may be represented by the equation:

$$\mathcal{L}_{chamfer}(\mathcal{S}^{gt}, \hat{\mathcal{S}}) = \sum_{\substack{s_l \in \mathcal{S}^{gt} \\ \sigma(m_k) > 0.5}} \min_{\hat{s}_k \in \hat{\mathcal{S}}} (s_l, \hat{s}_k) + \sum_{\substack{s_l \in \mathcal{S}^{gt} \\ \sigma(m_k) > 0.5}} \min_{\hat{s}_k \in \hat{\mathcal{S}}^{gt}} (s_l, \hat{s}_k)$$

The total loss function may be represented by the equation:

$$\mathcal{L}_{total} = \mathcal{L}_{chamfer}(\hat{\mathcal{S}}, \mathcal{S}^{gt}) + \lambda_m \text{BCE}(m, m^{gt})$$

where m corresponds to a fixed-dimensional vector with confidence scores for each path, and $m_{gt}$ corresponds to a ground-truth vector with values of 1 assigned to paths that are valid and with values of 0 assigned to paths that are invalid (e.g., paths that do not result in a signal component being received at a receiver).

In some aspects, to train the machine learning model and minimize (or at least reduce) the total loss, pairings of the estimated representation of channel components and the ground-truth representation of channel components may be organized in a matrix. For pairings with a confidence score $\sigma(m_k)$ less than a threshold value, the signal component pairings may be masked to reduce the amount of data processed in training the machine learning model. In some aspects, the pairings may further be padded with zero values to result in a matrix of valid pairings between ground-truth and estimated signal components that is appropriately sized for training the machine learning model.

Example Channel Rendering Using Machine Learning Models

Figure 5:
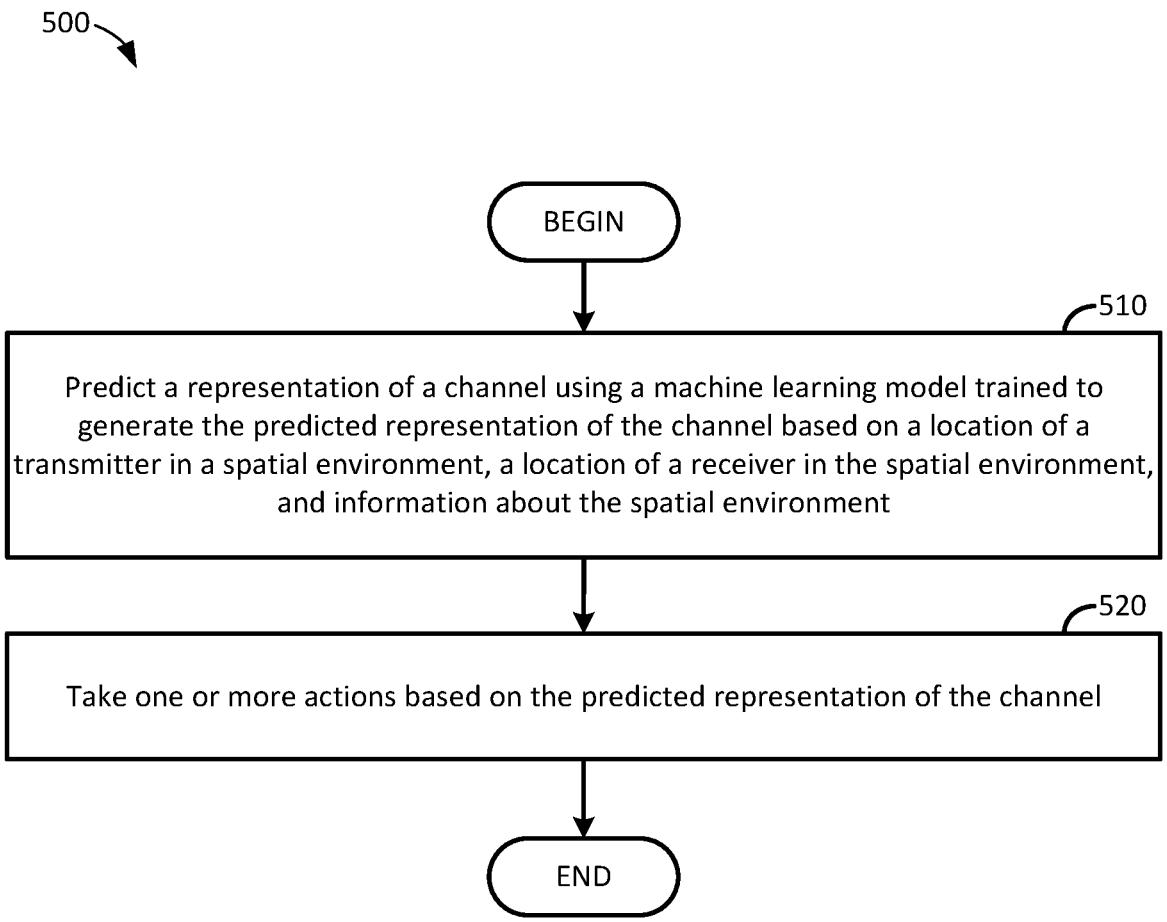
FIG. 5 depicts example operations for estimating a representation of a channel based on information about a spatial environment, a location of a receiver in the spatial environment, and a location of a transmitter in the spatial environment, according to aspects of the present disclosure.

FIG. 5 illustrates example operations 500 for estimating representation of a channel based on information about a spatial environment, a location of a receiver in the spatial environment, and a location of a transmitter in the spatial environment, according to aspects of the present disclosure. Operations 500 may be performed, for example, by a user equipment in a wireless communications system, such as UE 104 illustrated in FIG. 1, on which a machine learning model is deployed.

As illustrated, operations 500 begin at block 510, with estimating a representation of a channel using a machine learning model. The machine learning model is generally trained to generate the estimated representation of the channel based on a location of a transmitter in a spatial environment, a location of a receiver in the spatial environment, and information about the spatial environment. The information about the spatial environment may include, for example, a two-dimensional representation (e.g., a floor map) of the spatial environment. This two-dimensional representation may include boundary information for the spatial environment, the locations of walls or other reflecting/refracting surfaces in the spatial environment, and the like.

In some aspects, the machine learning model may include a first sub-model and a second sub-model. The first sub-model may be configured to encode the information about the spatial environment into an embedding representation of the spatial environment. The second sub-model may be configured to generate the estimated representation of the channel as a continuous representation based on the embedding representation of the spatial environment, the location of the transmitter in the spatial environment, and the location of the receiver in the spatial environment. The first sub-model may be a variational autoencoder, and the second sub-model may be a multilayer perceptron.

In some aspects, the machine learning model may be a model trained to minimize, or at least reduce, a Chamfer distance between an estimated state of the channel and an actual state of the channel. The Chamfer distance minimized (or reduced) between the estimated state of the channel and the actual state of the channel may be minimized (or at least reduced) on a per-signal-component basis, and the Chamfer distance between the estimated state of the channel and the actual state of the channel may be calculated as the sum of differences between respective components in vectors representing the same signal component in the estimated state of the channel and the actual state of the channel.

In some aspects, the machine learning model may be a model trained to minimize, or at least reduce, a loss between an estimated state of the channel and an actual state of the channel, the loss comprising a sum of a Chamfer distance and a weighted binary cross-entropy between an estimated representation of the channel and the actual state of the channel.

In some aspects, higher-dimensionality representations of the location of the transmitter in the spatial environment and the location of the receiver in the spatial environment are generated based on a Fourier transform or other transform. Generally, this higher-dimensionality representation may have more dimensions than two dimensions, where the locations of the receiver and transmitter in the spatial environment are represented on a flat plane, or more than three dimensions, where the locations of the receiver and transmitter in the spatial environment are plotted in a three-dimensional space. The higher-dimensionality representations may be used as input into the second sub-model in order to generate the estimated representation of the channel.

In some aspects, the estimated representation of the channel includes a plurality of vectors. Each vector generally corresponds to a respective signal component estimated to be received at the receiver. A vector includes received power, time of flight, angle of departure, and angle of arrival information for the respective signal component associated with the respective vector.

At block 520, operations 500 proceed with taking one or more actions based on the estimated representation of the channel. In some aspects, the taking one or more actions comprises generating a graphical rendering of the estimated representation of the channel in the three-dimensional representation of the spatial environment. In some aspects, the taking one or more actions comprises selecting one or more beams for communications between the transmitter and the receiver based on the estimated representation of the channel. In some aspects, the taking one or more actions comprises detecting presence and location of objects in the spatial environment based on the estimated representation of the channel. In some aspects, the taking one or more actions comprises identifying material properties of the spatial environment based on the estimated representation of the channel.

Generally, aspects of the present disclosure may provide for accurate and computationally efficient prediction of channels in a wireless network. These predictions may be spatially consistent and may accurately reflect the state of a channel in a spatial environment. Because the machine learning models discussed herein may provide for accurate and computationally efficient channel prediction, these predictions can be used to improve communications between transmitting and receiving devices (e.g., by detecting blockages in a spatial environment that may adversely affect signals communicated between a transmitting and a receiving device, predicting a best beam or set of beams for communications between devices, or the like). Further, the machine learning models discussed herein can use sensed data from the transmitter and receiver, as well as other sources (e.g., environmental maps, etc.), to accurately and efficiently render an estimate of a channel between devices in a spatial environment.

Figure 6:
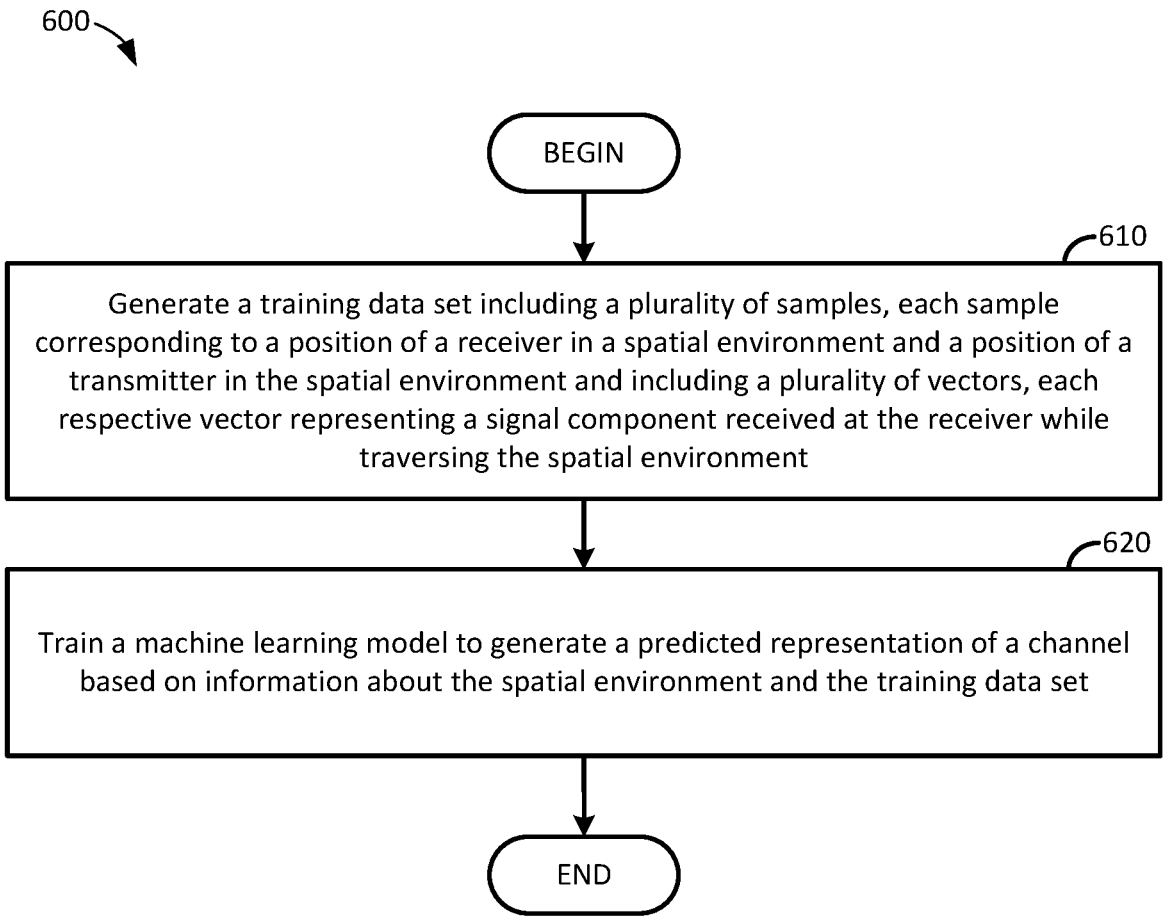
FIG. 6 depicts example operations for training a machine learning model to estimate a representation of a channel based on information about a spatial environment, a location of a receiver in the spatial environment, and a location of a transmitter in the spatial environment, according to aspects of the present disclosure.

FIG. 6 depicts example operations 600 for training a machine learning model to estimate a representation of a channel based on information about a spatial environment, a location of a receiver in the spatial environment, and a location of a transmitter in the spatial environment, according to aspects of the present disclosure.

As illustrated, operations 600 begin at block 610, with generating a training data set including a plurality of samples. Each sample may correspond to a location of a receiver in a spatial environment and a location of a transmitter in the spatial environment. Each sample generally includes a plurality of vectors representing signal components received at the receiver at a specific location in the spatial environment.

In some aspects, each vector of the plurality of vectors includes received power, time of flight, angle of departure, and angle of arrival information for the respective signal component associated with the respective vector.

In some aspects, the location of the receiver and the location of the transmitter may be high-dimensionality representations of lower-dimensional location information for the receiver and the transmitter. These higher-dimensionality representations of the location of the transmitter in the spatial environment and the location of the receiver in the spatial environment may be generated based on a Fourier transform or other transform. Generally, this higher-dimensionality representation may have more dimensions than two dimensions, where the locations of the receiver and transmitter in the spatial environment are represented on a flat plane, or more than three dimensions, where the locations of the receiver and transmitter in the spatial environment are plotted in a three-dimensional space.

At block 620, operations 600 proceed with training a machine learning model to generate an estimated representation of a channel based on information about the spatial environment and the training data set. For other aspects, the operations may involve generating a machine learning model for estimating a representation of a channel. In this case, the generating may comprise training the machine learning model.

In some aspects, training the machine learning model includes training a first sub-model and a second sub-model. The first sub-model may be trained to encode the information about the spatial environment into an embedding representation of the spatial environment. The second sub-model may be trained to generate the estimated representation of the channel as a continuous representation based on the embedding representation of the spatial environment, the location of the transmitter in the spatial environment, and the location of the receiver in the spatial environment. The first sub-model may be a variational autoencoder, and the second sub-model may be a multilayer perceptron. In some aspects, the first sub-model may be trained using unsupervised learning techniques, and the second sub-model may be trained using supervised learning techniques.

In some aspects, the machine learning model may be a model trained to minimize, or at least reduce, a Chamfer distance between an estimated state of the channel and an actual state of the channel. The Chamfer distance minimized (or reduced) between the estimated state of the channel and the actual state of the channel may be minimized (or at least reduced) on a per-signal-component basis, and the Chamfer distance between the estimated state of the channel and the actual state of the channel may be calculated as the sum of differences between respective components in vectors representing the same signal component in the estimated state of the channel and the actual state of the channel.

In some aspects, training the machine learning model may include masking components in the estimated representation of the channel for components having confidence scores below a threshold confidence score. Generally, the masked components may include components that have a low probability of meaningfully contributing to the channel received at the receiver. By masking these components, the machine learning model may be trained on a relevant set of signal components which may be significantly smaller than the overall set of signal components which may be generated by a transmitter in the spatial environment, which may reduce the computational expense of training these machine learning models.

In some aspects, the machine learning model may be a model trained to minimize, or at least reduce, a loss between an estimated state of the channel and an actual state of the channel, the loss comprising a sum of a Chamfer distance and a weighted binary cross-entropy between an estimated representation of the channel and the actual state of the channel.

Example Processing Systems for Channel Rendering Using Machine Learning Models

Figure 7:
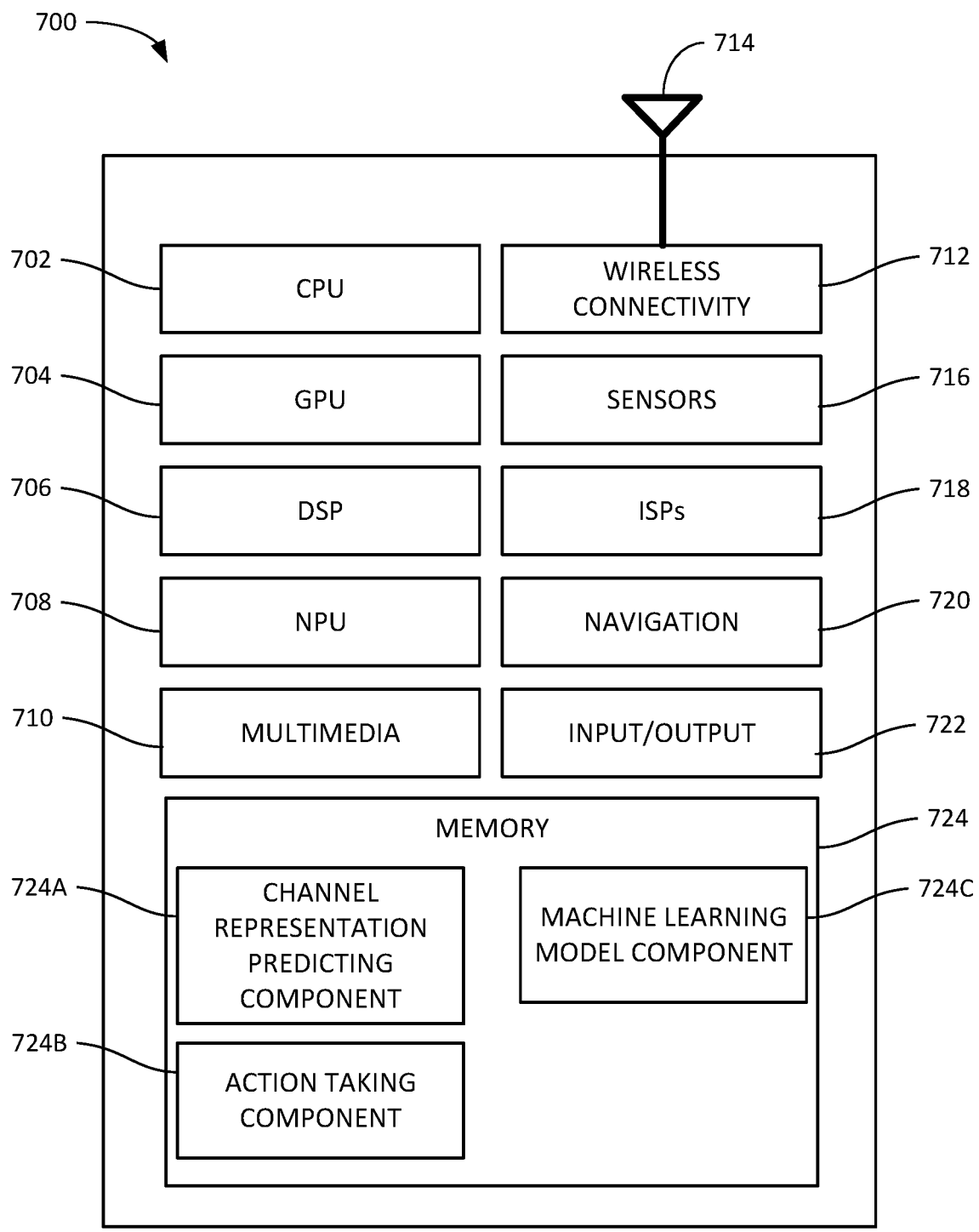
FIG. 7 depicts an example implementation of a processing system on which a machine learning model is used to estimate a representation of a channel in a spatial environment, according to aspects of the present disclosure.

FIG. 7 depicts an example processing system 700 for estimating a channel in a spatial environment based on a machine learning model, such as described herein for example with respect to FIG. 5.

Processing system 700 includes a central processing unit (CPU) 702, which in some examples may be a multi-core CPU. Instructions executed at the CPU 702 may be loaded, for example, from a program memory associated with the CPU 702 or may be loaded from a memory 724.

Processing system 700 also includes additional processing components tailored to specific functions, such as a graphics processing unit (GPU) 704, a digital signal processor (DSP) 706, a neural processing unit (NPU) 708, a multimedia processing unit 710, a wireless connectivity component 712.

An NPU, such as 708, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as 708, are configured to accelerate the performance of common machine learning tasks, such as image classification, machine translation, object detection, and various other estimative models. In some examples, a plurality of NPUs may be instantiated on a single chip, such as a system on a chip (SoC), while in other examples the NPUs may be part of a dedicated neural-network accelerator.

NPUs may be optimized (or specialized) for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong estimation involves propagating back through the layers of the model and determining gradients to reduce the estimation error. A degree by which a model is optimized may be related to the number of rounds over which a machine learning model is trained. Each additional round of training may further optimize a machine learning model to improve the accuracy of a model in generating inferences, which may be measured based on a difference between estimations generated by a machine learning model and ground-truth data for a given input into the machine learning model.

NPUs designed to accelerate inference are generally configured to operate on complete models. Such NPUs may thus be configured to input a new piece of data and rapidly process it through an already trained model to generate a model output (e.g., an inference).

In one implementation, NPU 708 is a part of one or more of CPU 702, GPU 704, and/or DSP 706.

In some examples, wireless connectivity component 712 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 712 is further connected to one or more antennas 714.

Processing system 700 may also include one or more sensor processing units 816 associated with any manner of sensor, one or more image signal processors (ISPs) 718 associated with any manner of image sensor, and/or a navigation processor 720, which may include satellite-based positioning system components (e.g., GPS or GLONASS) as well as inertial positioning system components.

Processing system 700 may also include one or more input and/or output devices 722, such as screens, touch-sensitive surfaces (including touch-sensitive displays), physical buttons, speakers, microphones, and the like.

In some examples, one or more of the processors of processing system 700 may be based on an ARM or RISC-V instruction set.

Processing system 700 also includes memory 724, which is representative of one or more static and/or dynamic memories, such as a dynamic random access memory, a flash-based static memory, and the like. In this example, memory 724 includes computer-executable components, which may be executed by one or more of the aforementioned processors of processing system 700.

In particular, in this example, memory 724 includes channel representation estimating component 724A, action taking component 724B, and machine learning model component 724C. The depicted components, and others not depicted, may be configured to perform various aspects of the methods described herein.

Generally, processing system 700 and/or components thereof may be configured to perform the methods described herein.

Notably, in other aspects, aspects of processing system 700 may be omitted, such as where processing system 700 is a server computer or the like. For example, multimedia processing unit 710, wireless connectivity component 712, sensor processing units 716, ISPs 718, and/or navigation processor 720 may be omitted in other aspects. Further, aspects of processing system 700 may be distributed, such as training a model and using the model to generate inferences, such as user verification estimations.

Figure 8:
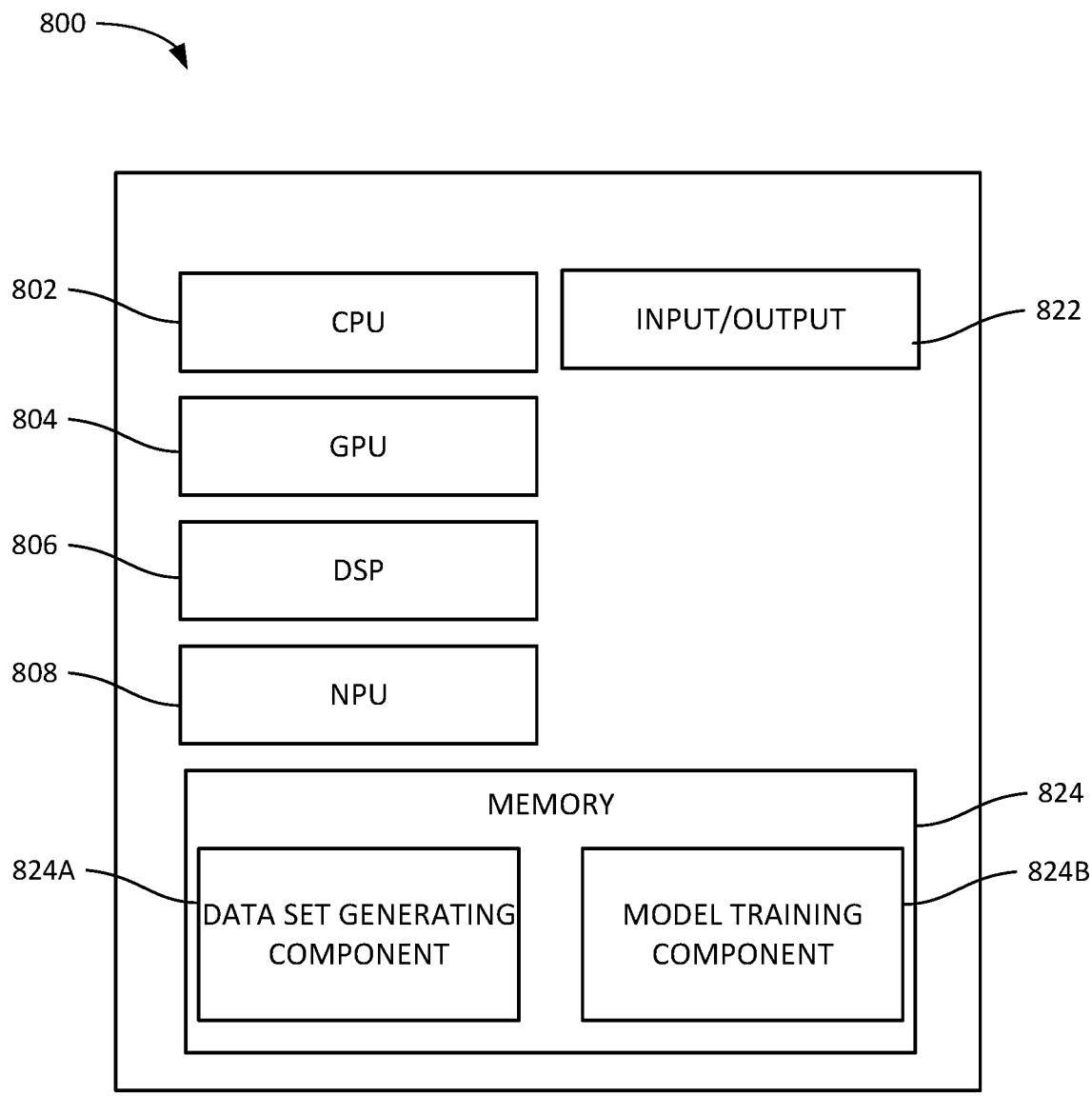
FIG. 8 depicts an example implementation of a processing system on which a machine learning model is trained to estimate a representation of a channel, according to aspects of the present disclosure.

FIG. 8 depicts an example processing system 800 for training a machine learning model to estimate a channel in a spatial environment, such as described herein for example with respect to FIG. 6.

Processing system 800 includes a central processing unit (CPU) 802, which in some examples may be a multi-core CPU. Processing system 800 also includes additional processing components tailored to specific functions, such as a graphics processing unit (GPU) 804, a digital signal processor (DSP) 806, and a neural processing unit (NPU) 808. CPU 802, GPU 804, DSP 806, NPU 808, and input and/or output devices 822 may be similar to CPU 802, GPU 804, DSP 806, NPU 808, and input and/or output devices 822 discussed above with respect to FIG. 8.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 812 may be further connected to one or more antennas (not shown).

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes data set generating component 824A and model training component 824B. The depicted components, and others not depicted, may be configured to perform various aspects of the methods described herein.

Generally, processing system 800 and/or components thereof may be configured to perform the methods described herein.

Example Clauses

Implementation details of various aspects are described in the following numbered clauses.

Clause 1: A computer-implemented method, comprising: estimating a representation of a channel using a machine learning model trained to generate the estimated representation of the channel based on a location of a transmitter in a spatial environment, a location of a receiver in the spatial environment, and information about the spatial environment; and taking one or more actions based on the estimated representation of the channel.

Clause 2: The method of Clause 1, wherein the information about the spatial environment comprises a two-dimensional representation of a layout of the spatial environment.

Clause 3: The method of Clause 1 or 2, wherein the machine learning model comprises a first sub-model configured to encode the information about the spatial environment into an embedding representation of the spatial environment and a second sub-model trained to generate the estimated representation of the channel as a continuous representation based on the embedding representation of the spatial environment, the location of the transmitter in the spatial environment, and the location of the receiver in the spatial environment.

Clause 4: The method of Clause 3, further comprising: generating, based on a Fourier transform, a higher-dimensionality representation of the location of the transmitter in the spatial environment; generating, based on a Fourier transform, a higher-dimensionality representation of the location of the receiver in the spatial environment; and inputting the higher-dimensionality representation of the transmitter in the spatial environment and the higher-dimensionality representation of the location of the receiver in the spatial environment into the second sub-model.

Clause 5: The method of Clause 3 or 4, wherein the first sub-model comprises a variational autoencoder.

Clause 6: The method of any of Clauses 1 through 5, wherein the estimated representation of the channel comprises a plurality of vectors, each respective vector of the plurality of vectors corresponding to a respective signal component estimated to be received at the receiver, each respective vector including information identifying a received power, a time of flight, an angle of departure, and an angle of arrival for the respective signal component associated with the respective vector.

Clause 7: The method of any of Clauses 1 through 6, wherein the machine learning model comprises a model trained to minimize a Chamfer distance between an estimated state of the channel and an actual state of the channel over time.

Clause 8: The method of any of Clauses 1 through 7, wherein the machine learning model comprises a model trained to minimize a loss between an estimated state of the channel and an actual state of the channel, the loss comprising a sum of a Chamfer distance and a weighted binary cross-entropy between an estimated state of the channel and the actual state of the channel.

Clause 9: The method of any of Clauses 1 through 8, wherein the taking one or more actions comprises generating a graphical rendering of the estimated representation of the channel in a representation of the spatial environment.

Clause 10: The method of any of Clauses 1 through 9, wherein the taking one or more actions comprises selecting one or more beams for communications between the transmitter and the receiver based on the estimated representation of the channel.

Clause 11: The method of any of Clauses 1 through 10, wherein the taking one or more actions comprises detecting presence and location of objects in the spatial environment based on the estimated representation of the channel.

Clause 12: The method of any of Clauses 1 through 11, wherein the taking one or more actions comprises identifying material properties of the spatial environment based on the estimated representation of the channel.

Clause 13: A computer-implemented method, comprising: generating a training data set including a plurality of samples, wherein each sample corresponds to a location of a receiver in a spatial environment and a location of a transmitter in the spatial environment, and each sample includes a plurality of vectors, each respective vector representing a respective signal component received at the receiver at a specific location in the spatial environment; and training a machine learning model to generate an estimated representation of a channel based on information about the spatial environment and the training data set.

Clause 14: The method of Clause 13, wherein training the machine learning model comprises: training a first sub-model to generate an embedding representation of the spatial environment based on the information about the spatial environment; and training a second sub-model to generate the estimated representation of the channel based on the embedding representation of the spatial environment and the training data set.

Clause 15: The method of Clause 14, wherein the first sub-model comprises a variational autoencoder.

Clause 16: The method of any of Clause 14 or 15, wherein the first sub-model is trained using unsupervised learning techniques and the second sub-model is trained using supervised learning techniques.

Clause 17: The method of any of Clauses 13 through 16, wherein each respective vector includes information identifying a received power, a time of flight, an angle of departure, and an angle of arrival for the respective signal component associated with the respective vector.

Clause 18: The method of any of Clauses 13 through 17, wherein: the location of the transmitter in the spatial environment comprises a high-dimensionality representation of the location of the transmitter generated based on a Fourier transform applied to a three-dimensional location of the transmitter, and the location of the receiver in the spatial environment comprises a high-dimensionality representation of the location of the receiver generated based on a Fourier transform applied to a three-dimensional location of the receiver.

Clause 19: The method of any of Clauses 13 through 18, wherein training the machine learning model comprises training the machine learning model to minimize a loss between an estimated state of the channel and an actual state of the channel.

Clause 20: The method of Clause 19, wherein the loss comprises a Chamfer distance between the estimated state of the channel and the actual state of the channel.

Clause 21: The method of Clause 20, wherein the loss further comprises a weighted binary cross-entropy between an estimated representation of the channel and the actual state of the channel.

Clause 22: The method of any of Clauses 13 through 21, wherein training the machine learning model comprises masking components in the estimated representation of the channel for components having confidence scores below a threshold confidence score.

Clause 23: A processing system, comprising: a memory comprising computer-executable instructions; and one or more processors configured to execute the computer-executable instructions and cause the processing system to perform a method in accordance with any of Clauses 1 through 22.

Clause 24: A processing system, comprising means for performing a method in accordance with any of Clauses 1 through 22.

Clause 25: A non-transitory computer-readable medium comprising computer-executable instructions that, when executed by one or more processors of a processing system, cause the processing system to perform a method in accordance with any of Clauses 1 through 22.

Clause 26: A computer program product embodied on a computer-readable storage medium comprising code for performing a method in accordance with any of Clauses 1 through 22.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
   estimating a representation of a channel using a machine learning model trained to generate the estimated representation of the channel based on a location of a transmitter in a spatial environment, a location of a receiver in the spatial environment, and information about the spatial environment; and
   taking one or more actions based on the estimated representation of the channel;
   wherein the machine learning model comprises:
      a first sub-model configured to encode the information about the spatial environment into an embedding representation of the spatial environment; and
      a second sub-model trained to generate the estimated representation of the channel as a continuous representation based on the embedding representation of the spatial environment, the location of the transmitter in the spatial environment, and the location of the receiver in the spatial environment.

2. The method of claim 1, wherein the information about the spatial environment comprises a two-dimensional representation of a layout of the spatial environment.

3. The method of claim 1, further comprising:
   generating, based on a Fourier transform, a higher-dimensionality representation of the location of the transmitter in the spatial environment;
   generating, based on a Fourier transform, a higher-dimensionality representation of the location of the receiver in the spatial environment; and
   inputting the higher-dimensionality representation of the transmitter in the spatial environment and the higher-dimensionality representation of the location of the receiver in the spatial environment into the second sub-model.

4. The method of claim 1, wherein the first sub-model comprises a variational autoencoder.

5. The method of claim 1, wherein the estimated representation of the channel comprises a plurality of vectors, each respective vector of the plurality of vectors corresponding to a respective signal component estimated to be received at the receiver, each respective vector including information identifying a received power, a time of flight, an angle of departure, and an angle of arrival for the respective signal component associated with the respective vector.

6. The method of claim 1, wherein the machine learning model comprises a model trained to minimize a Chamfer distance between an estimated state of the channel and an actual state of the channel over time.

7. The method of claim 1, wherein the machine learning model comprises a model trained to minimize a loss between an estimated state of the channel and an actual state of the channel, the loss comprising a sum of a Chamfer distance and a weighted binary cross-entropy between the estimated state of the channel and the actual state of the channel.

8. The method of claim 1, wherein the taking one or more actions comprises generating a graphical rendering of the estimated representation of the channel in a representation of the spatial environment.

9. The method of claim 1, wherein the taking one or more actions comprises selecting one or more beams for communications between the transmitter and the receiver based on the estimated representation of the channel.

10. The method of claim 1, wherein the taking one or more actions comprises detecting presence and location of objects in the spatial environment based on the estimated representation of the channel.

11. The method of claim 1, wherein the taking one or more actions comprises identifying material properties of the spatial environment based on the estimated representation of the channel.

12. A computer-implemented method, comprising:
    generating a training data set including a plurality of samples, wherein each sample corresponds to a location of a receiver in a spatial environment and a location of a transmitter in the spatial environment, and each sample includes a plurality of vectors, each respective vector representing a respective signal component received at the receiver at a specific location in the spatial environment; and
    training a machine learning model to generate an estimated representation of a channel based on information about the spatial environment and the training data set;
    wherein training the machine learning model comprises:
       training a first sub-model to generate an embedding representation of the spatial environment based on the information about the spatial environment; and
       training a second sub-model to generate the estimated representation of the channel based on the embedding representation of the spatial environment and the training data set.

13. The method of claim 12, wherein the first sub-model comprises a variational autoencoder.

14. The method of claim 12, wherein the first sub-model is trained using unsupervised learning techniques and the second sub-model is trained using supervised learning techniques.

15. The method of claim 12, wherein each respective vector includes information identifying a received power, a time of flight, an angle of departure, and an angle of arrival for the respective signal component associated with the respective vector.

16. The method of claim 12, wherein:
the location of the transmitter in the spatial environment comprises a high-dimensionality representation of the location of the transmitter generated based on a Fourier transform applied to a three-dimensional location of the transmitter, and
the location of the receiver in the spatial environment comprises a high-dimensionality representation of the location of the receiver generated based on a Fourier transform applied to a three-dimensional location of the receiver.

17. The method of claim 12, wherein training the machine learning model comprises training the machine learning model to minimize a loss between an estimated state of the channel and an actual state of the channel.

18. The method of claim 17, wherein the loss comprises a Chamfer distance between the estimated state of the channel and the actual state of the channel.

19. The method of claim 18, wherein the loss further comprises a weighted binary cross-entropy between the estimated state of the channel and the actual state of the channel.

20. The method of claim 12, wherein training the machine learning model comprises masking components in the estimated representation of the channel for components having confidence scores below a threshold confidence score.

21. A processing system, comprising:
a memory having executable instructions stored thereon; and
a processor configured to execute the executable instructions in order to cause the processing system to:
estimate a representation of a channel using a machine learning model trained to generate the estimated representation of the channel based on a location of a transmitter in a spatial environment, a location of a receiver in the spatial environment, and information about the spatial environment; and
take one or more actions based on the estimated representation of the channel;
wherein the machine learning model comprises:
a first sub-model configured to encode the information about the spatial environment into an embedding representation of the spatial environment; and
a second sub-model trained to generate the estimated representation of the channel as a continuous representation based on the embedding representation of the spatial environment, the location of the transmitter in the spatial environment, and the location of the receiver in the spatial environment.

22. The processing system of claim 21, wherein the first sub-model comprises a variational autoencoder.

23. The processing system of claim 21, wherein the estimated representation of the channel comprises a plurality of vectors, each respective vector of the plurality of vectors corresponding to a respective signal component estimated to be received at the receiver, each respective vector including information identifying a received power, a time of flight, an angle of departure, and an angle of arrival for the respective signal component associated with the respective vector.

24. The processing system of claim 21, wherein the machine learning model comprises a model trained to minimize a Chamfer distance between an estimated state of the channel and an actual state of the channel over time.

25. The processing system of claim 21, wherein the machine learning model comprises a model trained to minimize a loss between an estimated state of the channel and an actual state of the channel over time.

26. A processing system, comprising:
a memory having executable instructions stored thereon; and
a processor configured to execute the executable instructions in order to cause the processing system to:
generate a training data set including a plurality of samples, wherein each sample corresponds to a location of a receiver in a spatial environment and a location of a transmitter in the spatial environment, and each sample includes a plurality of vectors, each respective vector representing a respective signal component received at the receiver while traversing the spatial environment; and
train a machine learning model to generate an estimated representation of a channel based on information about the spatial environment and the training data set;
wherein in order to train the machine learning model, the processor is configured to cause the processing system to:
train a first sub-model to generate an embedding representation of the spatial environment based on the information about the spatial environment; and
train a second sub-model to generate the estimated representation of the channel based on the embedding representation of the spatial environment and the training data set.

* * * * *